United States Patent
Schwarz

(10) Patent No.: US 6,315,092 B1
(45) Date of Patent: Nov. 13, 2001

(54) ELECTROMECHANICALLY ACTUATED DISC BRAKE

(75) Inventor: Ralf Schwarz, Heidelberg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/554,650

(22) PCT Filed: Nov. 20, 1998

(86) PCT No.: PCT/EP98/07472

§ 371 Date: Jul. 14, 2000

§ 102(e) Date: Jul. 14, 2000

(87) PCT Pub. No.: WO99/27270

PCT Pub. Date: Jun. 3, 1999

(30) Foreign Application Priority Data

Nov. 21, 1997 (DE) ................................ 197 51 617
Feb. 5, 1998 (DE) ................................ 198 04 454

(51) Int. Cl.⁷ .................................................. F16D 69/00
(52) U.S. Cl. .................... 188/265; 188/71.9; 188/72.1; 188/72.8; 188/162
(58) Field of Search ................................. 188/71.1, 71.9, 188/72.1, 72.3, 72.8, 265, 69, 68, 158, 162

(56) References Cited

U.S. PATENT DOCUMENTS

| | | | |
|---|---|---|---|
| 3,627,087 | * 12/1971 | Eskridge | ................................... 192/8 |
| 4,567,967 | * 2/1986 | Crossman | ............................ 188/72.3 |
| 4,635,491 | * 1/1987 | Yamano et al. | ....................... 74/89.15 |
| 4,809,824 | * 3/1989 | Fargier et al. | ....................... 188/72.8 |
| 4,895,227 | * 1/1990 | Grenier et al. | ........................ 188/173 |
| 5,090,518 | * 2/1992 | Schenk et al. | ........................ 188/72.1 |
| 5,148,894 | * 9/1992 | Eddy, Jr. | ............................... 188/72.6 |
| 5,219,049 | * 6/1993 | Unterborn | ............................ 188/156 |
| 5,388,674 | * 2/1995 | Severinsson | ........................... 188/171 |
| 5,549,183 | * 8/1996 | Buchanan, Jr. et al. | .............. 188/265 |
| 5,829,845 | * 11/1998 | Maron et al. | ........................... 303/20 |
| 5,949,168 | * 9/1999 | Dieckmann et al. | ............... 310/75 R |
| 5,971,110 | * 10/1999 | Martin | .................................. 188/72.1 |
| 6,000,507 | * 12/1999 | Bohm et al. | ........................... 188/158 |
| 6,059,076 | * 5/2000 | Dietrich et al. | ....................... 188/156 |
| 6,112,864 | * 9/2000 | Suzuki et al. | ......................... 188/158 |
| 6,139,460 | * 10/2000 | Drennen et al. | ...................... 475/149 |
| 6,230,855 | * 5/2001 | Holding | ................................ 188/158 |

FOREIGN PATENT DOCUMENTS

| | | |
|---|---|---|
| 195 11 287 | 1/1996 | (DE) . |
| 196 01 983 | 7/1997 | (DE) . |
| 196 21 533 | 12/1997 | (DE) . |
| 196 28 804 | 1/1998 | (DE) . |
| 0 334 434 | 9/1989 | (EP) . |
| 0 398 531 | 11/1990 | (EP) . |
| 89 10 495 | 11/1989 | (WO) . |

OTHER PUBLICATIONS

Search Report of the German Patent Office for Application No. 198 04 454.2.

* cited by examiner

Primary Examiner—Robert J. Oberleitner
Assistant Examiner—Benjamin A Pezzlo
(74) Attorney, Agent, or Firm—Rader, Fishman & Grauer PLLC

(57) ABSTRACT

Suggested is a disc brake for motor vehicles which can be actuated by means of an electric motor with the interconnection of a reduction gear and which includes a floating caliper with two friction linings arranged within the brake caliper so as to be displaceable therein. The reduction gear is constructed as a threaded roller drive with threaded roller recoil the axially displaceable spindle whereof brings one of the two friction linings into engagement with a brake disc.

Figure 1:
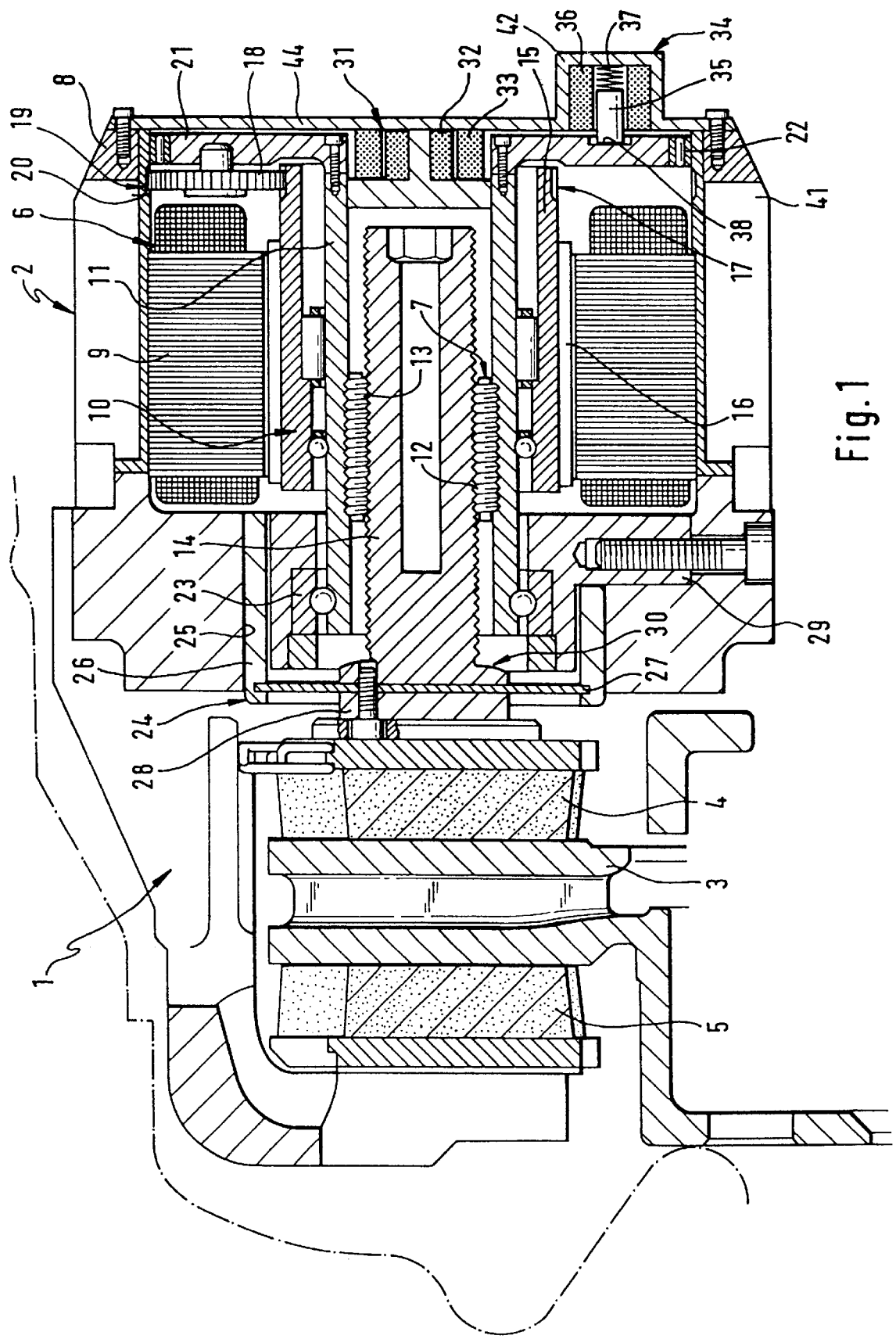

For the purpose of realizing a clamping or arresting function this invention suggests to provide a clamping or arresting device (34) cooperating with a rotating part (11) of the reduction gear (7) or with a part (21) having power-transmitting connection to the reduction gear (7) so as to lock the latter.

8 Claims, 3 Drawing Sheets

ELECTROMECHANICALLY ACTUATED DISC BRAKE

This invention relates to a disc brake for motor vehicles which can be actuated by means of an electric motor with the interconnection of a reduction gear, provided with an axially movable part, and which includes a brake caliper, two friction linings, each of them cooperating with one lateral surface each of a brake disc and arranged within the brake caliper so as to be displaceable therein to a limited extent, with one of the friction linings being engageable with the brake disc directly by the axially movable part and the other friction lining by the action of a reaction force applied by the brake caliper.

Such an electromechanically actuatable disc brake is known, e.g., from DE 195 11 287 A1. The actuating unit of this known disc brake consists of an electric motor, an actuating element as well as of a reduction gear arranged between electric motor and actuating element. This reduction gear is designed as a threaded roller drive with threaded roller recoil. The axial displacement of the spindle of the threaded roller drive brings the friction lining associated with the actuating element in engagement with the disc brake. The actuating element of the prior-art disc brake is formed by the spindle of the threaded roller drive the threaded nut of which is driven by the electric motor in order to generate a corresponding clamping force. A large-diameter cross-roll bearing arranged within the brake caliper serves to support the threaded nut. What is considered a disadvantage in the known electromechanically actuatable disc brake of prior art is the fact that it does not enable any parking brake function to be realized.

An electrically actuatable disc brake, combined with a parking brake, is known from DE 196 01 983 C1. The electromagnetic actuator of this prior-art disc brake takes care both of the service brake and parking brake functions. The clamping or arresting function of this brake is realized in that a metal pin actuatable by means of an electric magnet is provided with a friction head pressed against the spindle nut of a reduction gear, whereby a friction force is formed which leads to a self-locking action of the clamping device and, hence, to the brake linings' being fixed.

What is to be considered less advantageous in this prior-art brake is the rather large constructional space required to generate a force acting laterally on the threaded nut. A further disadvantage is the fact that the amount of increase of the internal friction is varying a great deal and depends on various environmental conditions such as wear and tear and temperature or the like.

It is thus an object of the present invention to improve an electromagnetically actuatable disc brake of the type mentioned above in that the constructional space required for realizing the clamping or arresting function is kept small while using parts manufacturable at low cost. Moreover, the parking brake function is to be completely independent of environmental conditions as wear and tear and temperature or the like or rather to depend on them to a very small extent, only.

According to this invention, this task is solved in that, a clamping or arresting device is provided which cooperates with a rotating part of the reduction gear or with a part having a power-transmitting connection to the reduction gear so as to lock the latter.

A further reduction of the constructional space and of energy requirements is achieved in an advantageous further development in that the parts cooperating with the clamping or arresting device are parts which transmit small torques when the brake is applied.

In giving the inventive idea a concrete form, it is provided that the clamping or arresting device is constructed as a friction brake or as a locking unit.

A particularly beneficial further development of the subject matter of this invention is characterized in that the clamping or arresting device is formed by a tappet which can be actuated by means of an electromechanical transmitter, preferably by means of an electric lifting magnet, and which cooperates with the rotating part and, preferably in the de-energized condition, cooperates with the rotating part under the prestress of a spring.

In another beneficial further development of this invention, a planetary gear is arranged between electric motor and reduction gear, with the rotating part being a planet carrier carrying the planet wheels of the planetary gear. The planet carrier is provided with at least one recess which the tappet can be introduced into.

Another advantageous embodiment of this invention provides that the rotating part is a threaded nut cooperating with the threaded spindle.

In the first-mentioned embodiment, wherein the clamping or arresting device is constructed as a friction brake, it is particularly advantageous if both the tappet and the rotating part are provided with a friction surface.

In an advantageous further development of the subject matter of this invention, the tappet features a conical design and cooperates with a conical surface provided on the end of the threaded nut which is averted from the friction linings.

In the second-mentioned embodiment, wherein the clamping or arresting device has the design of a locking unit, it is a particular advantage if the tappet is clamped within a recess provided in the rotating part.

In a particularly compact-construction embodiment of the abovementioned type, the tappet includes an angular portion which cooperates with at least one slope surface provided on the rotating part and confining the recess. This measure, in particular, minimizes the stroke and the energy requirements of the abovementioned electric lifting magnet.

Figure 2:
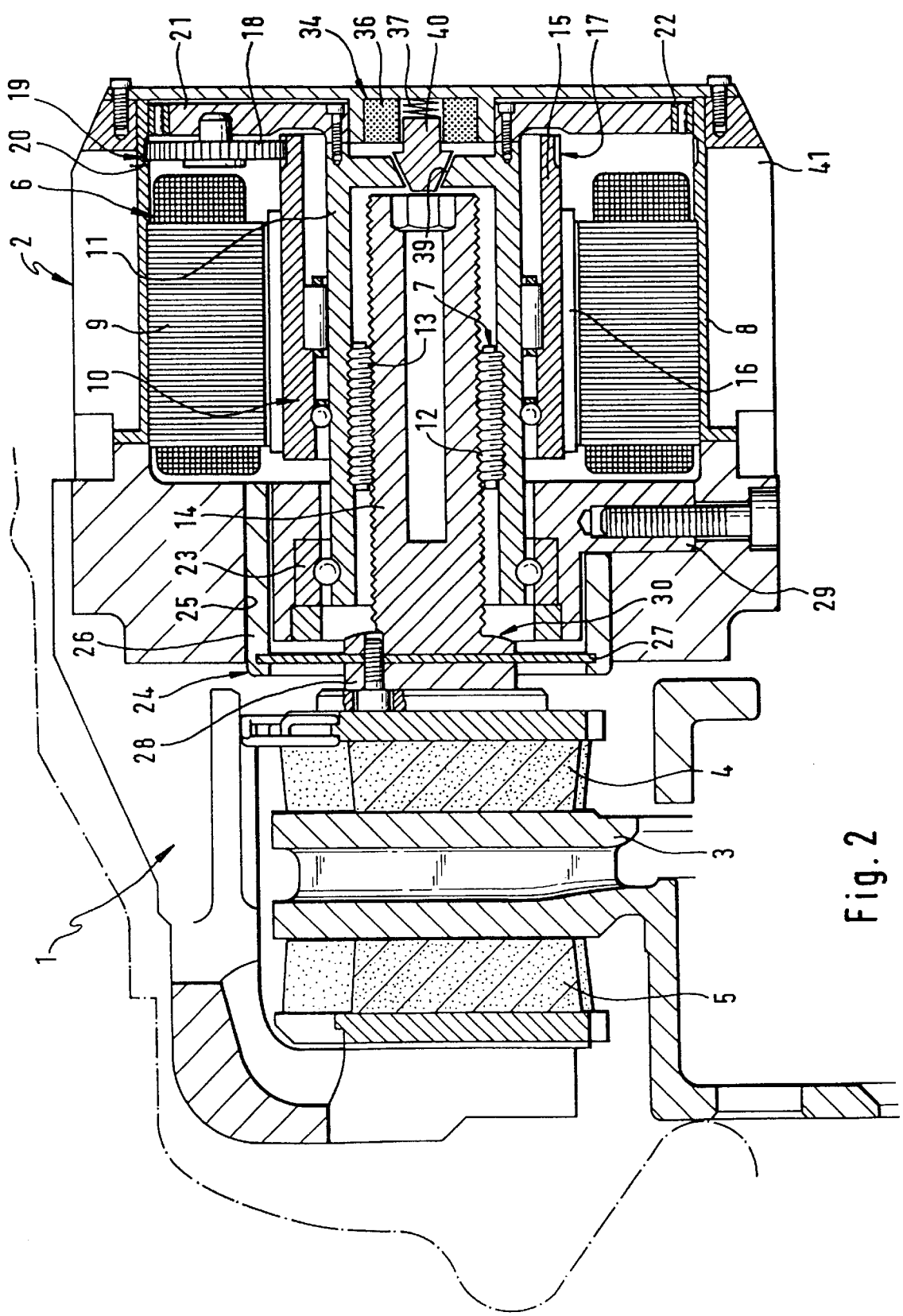
Figure 3:
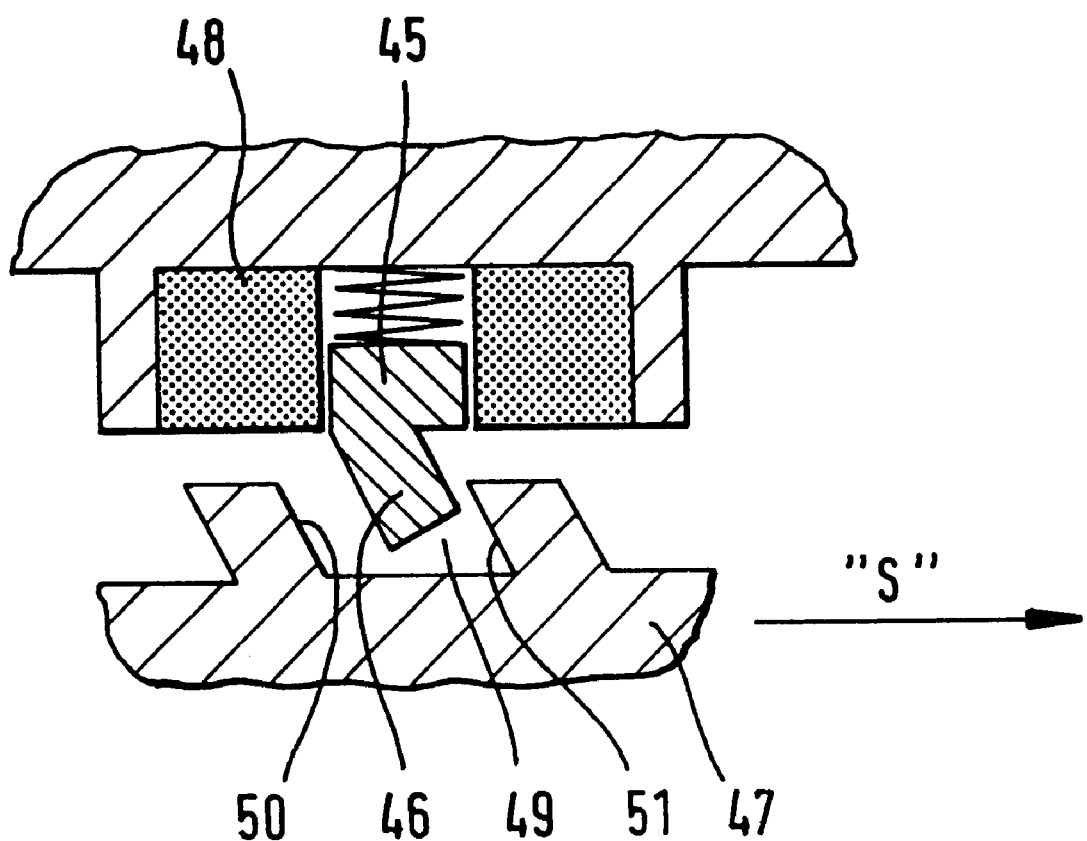

In the following description of two examples of embodiments, this invention will be explained in more detail, reference being made to the accompanying drawing, wherein FIG. 1 is an axial section of a first embodiment of the inventive electromechanically actuatable disc brake;

FIG. 2 is an axial section of a second embodiment of the inventive disc brake; and FIG. 3 is a detail of a third embodiment of a clamping or arresting device used on the inventive disc brake.

The electromechanically actuatable disc brake of this invention, represented in FIG. 1 of the drawing, which in the illustrated example features the design of a floating-caliper disc brake essentially consists of a brake caliper 1 displaceably supported within a non-illustrated stationary supporting device as well as of an actuating unit 2 the housing 8 of which is arranged on the brake caliper 1 by means of non-illustrated fastening elements. Friction linings 4 and 5 are arranged within the brake caliper 1 so that they face the right and left lateral surfaces of a brake disc 3.

In the following, friction lining 4 shown on the right-hand side of the drawing is referred to as first friction lining and the other friction lining marked 5 is referred to as second friction lining.

While the first friction lining 4 can directly be brought into engagement with brake disc 3 by means of an actuating element 30 under the action of an actuating force applied by the actuating unit 2 the second friction lining 5 is applied against the opposite lateral surface of brake disc 3 by means of the action of a reaction force applied by the brake caliper 1 upon the actuation of the assembly.

The abovementioned actuating unit 2 consists of an electric motor 6 which, in the illustrated example, is designed as a permanent-magnet-excited and electronically commutable (torque) motor the stator 9 of which is disposed unmovably within housing 8 and the rotor 10, or rather hollow shaft, of which is formed by an annular carrier 15 carrying a pluralitude of several permanent magnet segments 16. A reduction gear 7 is operatively arranged between the torque motor 6 and the abovementioned actuating element 30, preferably coaxially to the motor 6. In the illustrated example, this reduction gear is a threaded roller drive 11 through 14. The threaded roller drive mainly includes a threaded nut 11 as well as a threaded spindle 14, with threaded rollers 12, 13 being arranged axially parallel between threaded nut 11 and threaded spindle 14 and performing a planet-type rotation upon a rotational movement of the threaded nut 11 and causing a translatory movement of the threaded spindle 14.

The arrangement is preferably such that the threaded nut 11 is driven by the rotor 10 of the torque motor 6 by means of a planetary gear 17, 18, 19, 20, 21. The planetary gear consists of a sun wheel formed by a toothed area 17 provided on the end of rotor 10, of a plurality of planet wheels, with one of them being represented and referred to by reference numeral 18, of an internal geared wheel 19 formed by an internal toothing 20 provided within housing 8, as well as of a planet carrier 21 preferably fastened on the end of the threaded nut 11. The support of the planet carrier 21 within housing 8 of actuating unit 2 is realized by means of a radial bearing 22. The other end of threaded nut 11 is supported within a bearing 23 taking up axial and radial forces and provided within a bearing support 29 arranged within brake caliper 1. There is achieved an increase in the degree of efficiency of the inventive brake by arranging the planetary gear 17–21 on the side of the housing 8, which is averted from the friction linings 4, 5, i.e., in an area where there is no ovalization of the internal geared wheel 19 due to clamping forces. It is also possible to reduce the play of tooth flanks in order to improve the quality of clamping force reconstruction and control quality. In doing so, the abovementioned bearing support 29 can preferably accommodate a non-illustrated clamping force sensor system as all the clamping forces are supported via this bearing support 29.

The abovementioned actuating element 30 is formed by the threaded spindle 14. The end of this spindle which faces first friction lining 4 cooperates with a linear guideway provided with reference numeral 24. Guideway 24 of the example illustrated in FIG. 1 is formed by a cylinder 26 which is axially displaceable within a bore 25 within brake caliper 1 and which on its end which faces first friction lining 4 carries a metallic plate 27 of little material thickness, with power transmission taking place from the threaded spindle 14 to the first friction lining 4 via the central area of said metallic plate 27. Plate 27, preferably made of spring steel, is flexible along the direction of power transmission, however, rigid along the transverse direction. Provided between plate 27 and the first friction linin 4 is a power transmitting element or rather a pressure means 28 connected with the threaded spindle 14, e.g., by means of a threaded bolt. By means of the described design of the linear guideway 24 or 26, 27, respectively, it is achieved that the movement of the cylinder 26 within bore 25, on the one hand, and also the bending of plate 27, on the other hand, enable the pressure means 28 which axially abuts on the first friction lining 4 to move axially, with the transverse forces which act on the pressure means 28 being directly discharged into the brake caliper 1 via the cylinder 26. If, during application of the friction linings 4, 5 to the brake disc 3, the cylinder 26 becomes wedged under the action of the then ensuing circumferential forces the remaining application travel of the linings 4, 5 (e.g., approximately 1 mm with 25 kN [=kilo newton]) will be covered by axial deformation of the spring plate 27.

A contactless transducer or rather angular transducer is provided within housing 8 of the actuating unit 2 in order to position the threaded roller drive 7 exactly as well as in order to obtain control signals for electronic commutation of the torque motor 6. In the illustrated example a socalled resolver 31 is used as (angular) transducer which consists of two coaxial rings 32, 33 separated from each other by means of an air gap and carrying electric windings. The radially inside ring 32 of this design is connected with the threaded nut 11 while the other, radially outer ring 33 is arranged non-rotatably within housing 8.

However, another, non-represented embodiment is also conceivable wherein a radial bearing is disposed in the space, provided for the abovementioned resolver. This radial bearing serves to support the threaded nut or rather the planet carrier connected therewith.

Finally, the housing 8 is provided with large-surface cooling ribs 41 in order to enable the heat forming during the operation of the torque motor 6 to be transmitted efficiently to the surroundings.

A clamping or arresting device 34 is provided in order to realize a parking brake function in the above-described inventive disc brake. In the example illustrated in FIG. 1, this clamping or arresting device 34 cooperates with the abovementioned planet carrier 21. In the embodiment represented, the clamping or arresting device 34 is arranged within a parking brake housing 42 integrally formed on the cap 44 locking housing 8 of the actuating unit 2 and has the design of a locking unit essentially consisting of a tappet 35 which, under the action of a spring 37, engages a recess 38 provided in the planet carrier 21 and is actuatable by means of an electromechanical transmitter which in the represented example has the design of an electric lifting magnet 36.

In the second embodiment of the subject matter of this invention, the abovementioned clamping or arresting device 34 which in the represented example is designed as a friction brake cooperates with the threaded nut 11. As illustrated in FIG. 2, the tappet 40 is conical and, under the prestress of spring 37, is brought into engagement with a conical annular surface 39 provided within the threaded nut 11. In order to increase the desired friction both the surface of the conical tappet 40 and the annular surface 39 may be designed as friction surfaces. Such an embodiment of the clamping or arresting device 34 has the advantage that, in the event of a failure of the clamping or arresting function caused, e.g., by a defective electric lifting magnet 36, it will still be possible to release the brake, namely, by applying a torque by means of the electric motor 6 which exceeds the torque required to overcome the mentioned friction torque.

FIG. 3 represents another embodiment of the locking unit serving as clamping or arresting device. When realizing the clamping or arresting function, the tappet 45 provided with an angular portion 46 is introduced into recesses provided in the rotating part 47. In FIG. 3, one of these recesses is shown and provided with reference numeral 49. Recess 49 the width of which considerably exceeds the width of tappet 45 is preferably confined by two slope surfaces 50, 51 the pitch of which corresponds to the pitch of the angular portion 46 of tappet 45. It is possible to construct the electric lifting magnet 48 smaller since, for release, the tappet 45 is pushed back by angular portion 46 under the action of a further clamping of the brake. This measure results in an increase in the plunge depth of tappet 45 within electric lifting magnet 48. The clamping direction of the rotating part 47 is indicated by an arrow "S".

The clamping or arresting function is realized by the following procedure:

The service brake is adjusted by the actuation of the electric motor 6 to have a clamping force corresponding to the desired locking or arresting force. Subsequently the electromechanical transmitter or rather electric lifting magnet 36 of the clamping or arresting device becomes de-energized. In the event of a construction of the clamping or arresting device as a locking unit, the service brake then is moved back, electrically controlled, while simultaneously checking the movement of rotor 10, threaded nut 11 or rather planet carrier 21, until the current fed to electric motor 6 (or rather the current discharged in accordance with the position of the rotor) exceeds a certain threshold (locking). Upon releasing the clamping or arresting function, the electromechanical transmitter or rather electric lifting magnet 36 is energized whereby the tappet 35 is retracted out of recess 38 or rather the two friction partners 39, 40 (FIG. 2) are caused to disengage. In the event of a construction of the brake as a locking unit the brake is further clamped, position-controlled, until a distance has been covered which is equivalent to at least once the width of the recess of the planet carrier 21 (this being an indication of the fact that the tappet 35 was retracted from recess 38).

LIST OF REFERENCE NUMERALS 1 brake caliper
2 actuating unit
3 brake disc
4 friction lining
5 friction lining
6 electric motor
7 reduction gear
8 housing
9 stator
10 rotor
11 threaded nut
12 threaded roller
13 threaded roller
14 threaded spindle
15 carrier
16 permanent magnet segment
17 sun wheel, area
18 planet wheel
19 internal geared wheel
20 internal toothing
21 planet carrier
22 radial bearing
23 bearing
24 guideway
25 bore
26 cylinder
27 plate
28 power transmitting part, pressure means
29 bearing support
30 actuating element
31 resolver
32 ring
33 ring
34 clamping or arresting device
35 tappet
36 electric lifting magnet
37 spring
38 recess
39 surface
40 tappet
41 rib
42 parking brake housing
43
44 cap
45 tappet
46 angular portion
47 part
48 electric lifting magnet
49 recess
50 slope surface
51 slope surface

What is claimed is:

1. A disc brake for motor vehicles which can be actuated by means of an electric motor, comprising:
    a reduction gear,
    a planetary gear arranged between the electric motor and the reduction gear, the planetary gear including a first rotating part comprising a planet carrier carrying a plurality of planet wheels of the planetary gear, the planet carrier having a recess, and
    a clamping device which cooperates with the recess of the first rotating part of the planetary gear so as to lock the reduction gear in place.

2. A disc brake as claimed in claim 1, wherein said first part transmits small torques when the brake is applied.

3. A disc brake as claimed in claim 1, wherein the clamping device is constructed as a locking unit.

4. A disc brake as claimed in claim 1, wherein the clamping device is formed by a tappet actuatable by means of an electromechanical transmitter and cooperating with the first rotating part of the planetary gear.

5. A disc brake as claimed in claim 4, wherein in a de-energized condition, the tappet cooperates with the first rotating part of the planetary gear under the prestress of a spring.

6. A disc brake as claimed in claim 1, wherein the reduction gear comprises a threaded nut, a threaded spindle, and a plurality of rollers arranged between the threaded nut and the threaded spindle.

7. A disc brake for motor vehicles which can be actuated by means of an electric motor, comprising:
    a reduction gear comprising a threaded nut, a threaded spindle and a plurality of threaded rollers arranged between the threaded nut and the threaded spindle, the reduction gear capable of moving a threaded spindle in an axial direction for cooperating with a brake caliper,
    a planetary gear arranged between the electric motor and the reduction gear, the planetary gear including a rotating part comprising a planet carrier carrying a plurality of planet wheels of the planetary gear, the planet carrier having a recess formed therein, and
    a tappet actuatable by means of an electromechanical transmitter which cooperates with the recess of the rotating part of the planetary gear so as to lock the threaded spindle of the reduction gear in place.

8. A disc brake as claimed in claim 7, wherein in a de-energized condition, the tappet cooperates with the rotating part of the planetary gear under the prestress of a spring.

* * * * *